United States Patent [19]
Fiedler

[11] 3,742,823
[45] July 3, 1973

[54] PISTON STRUCTURE
[76] Inventor: Max G. Fiedler, 585 Pugh Road, Strafford, Pa.
[22] Filed: Sept. 27, 1971
[21] Appl. No.: 184,083

[52] U.S. Cl. .................................. 92/219, 277/178
[51] Int. Cl. ............................ F16j 1/02, F16j 9/20
[58] Field of Search ..................... 92/216, 219, 208, 92/193, 246, 255; 277/178, 193, 58

[56] References Cited
UNITED STATES PATENTS
| | | | |
|---|---|---|---|
| 1,761,982 | 6/1930 | Dunning | 92/193 |
| 2,012,956 | 9/1935 | Chaffin | 277/178 X |
| 2,577,022 | 12/1951 | Lieberherr | 92/246 X |
| 3,315,881 | 4/1967 | Halpin et al. | 277/58 |

FOREIGN PATENTS OR APPLICATIONS
356,943   9/1931   Great Britain ..................... 277/178

Primary Examiner—Irwin C. Cohen
Attorney—John Lezdey et al.

[57] ABSTRACT

The piston structure comprises a body having a substantial number of circumferential grooves each receiving a piston ring, the radially outer portions of said rings extending vertically in spaced relation to the piston to comprise, in effect, a substantially continuous cylinder wall-engaging sleeve, thus reducing contact of the piston itself with the cylinder wall, groove engaging portions of the rings spaced from the bottoms of the grooves to receive oil for cushioning the rings and permitting expansion of the piston.

2 Claims, 3 Drawing Figures

PATENTED JUL 3 1973　　　　　　　　　　　　　　　3,742,823

INVENTOR
MAX G. FIEDLER

BY *John Leydey*

ATTORNEY

PISTON STRUCTURE

BRIEF SUMMARY OF THE INVENTION

One of the features of the invention is that it eliminates the difficulty involved in the expansion and contraction of the piston body, thus eliminating piston slap at low engine speeds and before the engine is thoroughly warmed up. Moreover, the invention reduces the residual heat of the piston so that the compression ratio can be increased substantially so as to increase the thermal efficiency of the engine. The piston body may be made of any suitable material as further discussed below, with such piston body provided with a series of peripheral grooves with interposed lands. In each groove is arranged a split piston ring of T-cross section arranged with the shanks of the T's in the respective grooves and with the remaining portions of the rings overlying the lands and extending in close proximity to each other. These piston rings constitute, in effect, a sleeve extending throughout the greater portion of the length of the piston and such sleeve is made up of individually radially shiftable rings, thus adjusting perfectly to the wall of the cylinder.

The portions of the rings extending into the grooves are slightly spaced from the extremities thereof to receive oil which tends to cushion the rings and silence operation of the piston, the latter running very quietly regardless of temperature and engine speeds. Since successive rings are in contact with each other, perfect sealing occurs between the rings and the cylinder wall, and each ring is supported and fixed in vertical position by the lands on the piston between the rings.

Preferably but not necessarily, the upper end of the piston is provided with one or more grooves each of which receives a sealing ring having its outer surface slightly tapered to decrease in diameter downwardly to be maintained in snug engagement with the cylinder wall by pressure.

DETAILED DESCRIPTION

Figure 1:
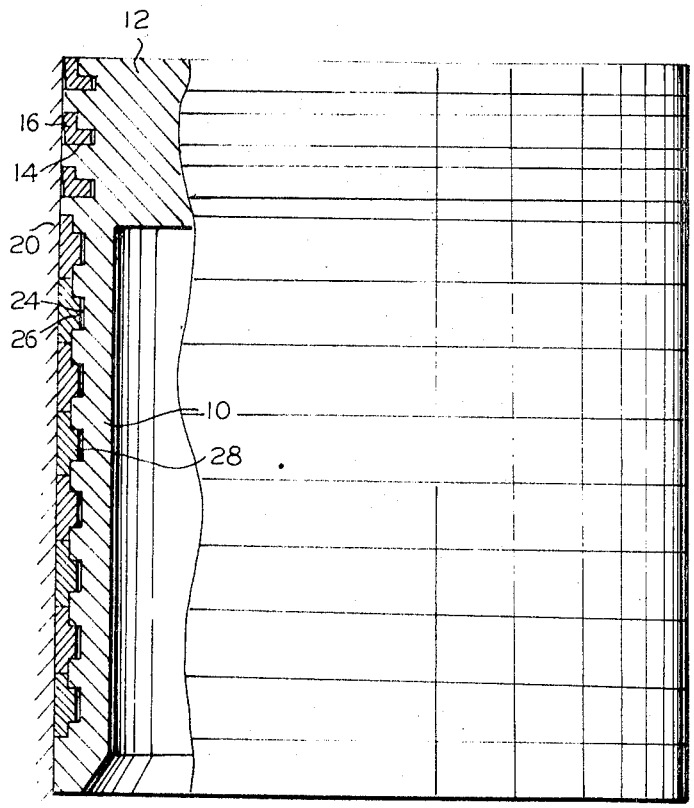
FIG. 1 is a side elevation of a piston having one side broken away and shown in section to illustrate the arrangement of the rings, a portion of the cylinder being shown in section.

Referring to FIG. 1, the numeral 10 indicates the piston skirt having a head 12. Outwardly of the head 12, the piston body is provided with one or more L-shaped grooves 14 in each of which is arranged a sealing ring 16 of L-shaped cross section. The peripheral surface of the ring is tapered as at 18 (FIG. 2) to utilize combustion chamber pressures to seal the rings against the cylinder wall indicated by the numeral 20. Beneath each sealing ring 16 is formed a conventional land 22 to support the ring thereabove. The use of the sealing rings are preferred but not essential.

Figure 2:
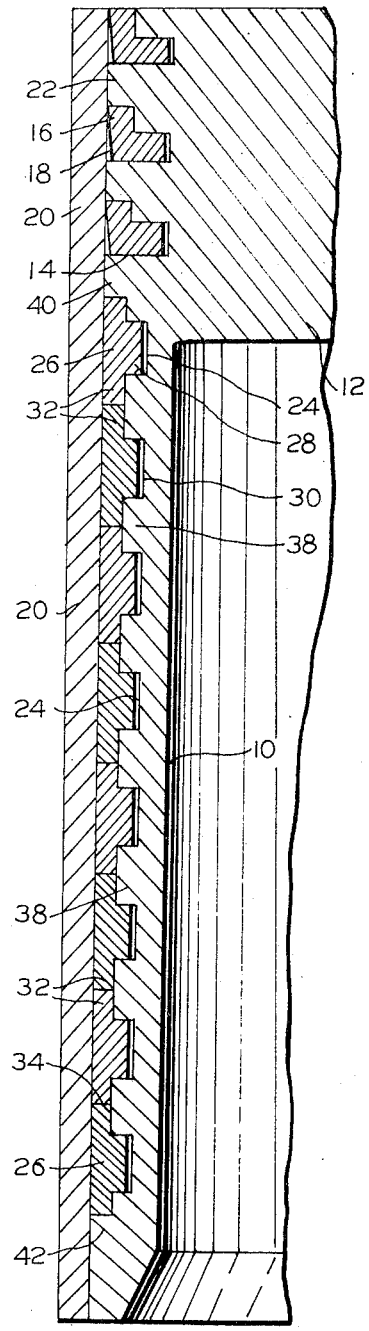
FIG. 2 is a similar view somewhat enlarged particularly to show the tapering of the sealing rings.

Referring to FIGS. 1 and 2, the piston skirt is provided with a substantial number of peripheral grooves 24, each of which is adapted to receive a piston ring 26 of T-shaped cross section with the shank of the T, 28, arranged in the narrower portion of the associated groove 24. The inner extremity of each ring is spaced as at 30 from the innermost portion of its associated groove 24 to receive oil seeping thereinto during the operation of the engine.

Figure 3:
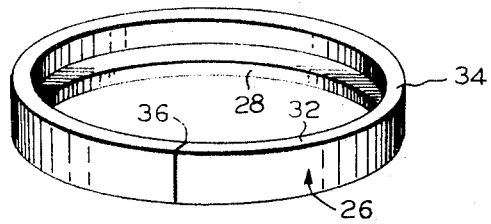
FIG. 3 is a perspective view of one of the piston rings.

The outer portion of each ring is widened transversely thereof, that is, longitudinally of the piston, as at 32 and these portions have their horizontal surfaces 34 in contiguous relationship in the sense of being close to each other. In practice, it is preferred that these surfaces be in sliding contact with each other. Each ring 26 is split as at 36 (FIG. 3) and this split may be square with the ends in normal contact with each other but free to expand.

Above and below each ring 26 the piston body is provided with a land 38 and these lands serve to fix the piston rings against vertical movement as will be apparent. Obviously, the upper land 40 for the uppermost piston ring is partly utilized as one of the lands 22, while the lowermost land 42 is arranged beneath the lowermost ring 26.

OPERATION

It will be noted that the rings 26 cooperate with each other to provide, in effect, a continuous sleeve which extends throughout the greater portion of the length of the piston. The outer surface of the piston which contacts with the cylinder wall is thus quite limited since each ring 26 is free to expand and contract independently, thus maintaining the sealing engagement of the rings with the cylinder wall. Because of the sliding contact of the rings with each other and the substantial number of rings employed, the split 36 may be square, and leakage past the piston is substantially negligible. As stated, the use of one or more sealing rings 16 is preferred but not essential.

Research has proved that the weight of the piston is of less consideration than heat conductivity, particularly in Diesel type engines. Such research determined that by reducing the residual heat of the piston, the compression ratio can be increased substantially so as to increase the thermo efficiency of the engine. Subsequently the automobile industry developed an aluminum piston for use in a cast iron engine block, and the principal drawback of the aluminum piston was that it had greater thermal expansion than a cast iron piston. Also, since the running clearance must be matched to maximum load and temperature, the piston would be noisy at lighter loads due to piston slap.

A common solution of this problem has been to provide a separate skirt for the piston crown and to connect the skirt and crown through a low expansion material. This method cannot be adopted for engines wherein the piston overruns parts and acts as a valve. The use of the substantial number of piston rings described above overcomes such problem. It also has been found that the present piston can be utilized in all types of engines so as to give more effective sealing of the piston with the cylinder wall. It has been found that by the use of a "sleeve" comprising a plurality of split rings, as shown and described, the problem relating to the unequal expansion of the cylinder wall and piston is alleviated.

The novel piston contains split sealing rings of L-shape which are supported by lands on the piston surface. The sealing rings are tapered so that gas pressure holds them against the cylinder wall. Along the piston for a substantial portion of its length, and preferably the greater portion of its length, are arranged the piston rings in contiguous relationship and forming, in effect, a continuous sealing sleeve or skirt.

Among the advantages of the use of the split piston rings as a sleeve or skirt for the piston is that the rings adjust so as to provide for continuous sealing upon the initial starting of the engine and adjust upon expansion of the cylinder wall and piston during continuous operation of the engine. Additionally, the rings provide for continuous adjustment when there is unevenness of the cylinder wall due to wear and/or manufacturing defects. The present piston has the following advantages:

1. It is easy to manufacture.
2. It is easy to fasten the rings on the piston.
3. It reduces noise due to hydraulic cushioning behind the series of piston rings.
4. It does away with clearance problems due to heat expansion of the piston and/or cylinder.
5. It reduces the residual heat of the piston, thus permitting the compression ratio to be increased substantially so as to increase the thermal efficiency of the engine.

The present invention does away with clearance problems due to the heat expansion of the piston. The piston may be made of any material compatible with the cylinder block or cylinder liner. Cast iron pistons are preferable, and they may be chromium or steel plated, for example. If a hard coated aluminum liner is used in each cylinder, cast iron is the best material for the pistons.

I claim:

1. In an internal combustion engine, a cylinder, a piston structure reciprocable in said cylinder, said piston structure comprising a piston body including a head portion and a skirt portion, said skirt portion having a plurality of grooves extending circumferentially therearound in spaced relation over a major portion of said skirt portion, said piston body between and adjacent said grooves being of smaller diameter than the internal diameter of said cylinder, at least one L-shaped sealing ring mounted at the upper end of said piston in said head portion, said L-shaped sealing ring having an outer periphery being tapered to decrease in diameter downwardly, a plurality of T-shaped support rings arranged in said grooves, each of said support rings having the radially inner portion substantially equal to the radially outer portion of said ring, the radially inner portion of each of the support rings projecting into one of said grooves, the radially outer portion of each support rings having a cylinder surface in slidable engagement with said cylinder, said rings having end surfaces in contiguous relationship with each other, whereby said radially outer portions of said rings comprise in effect a continuous cylinder-engaging sleeve extending substantially throughout the greater portion of the length of said piston body.

2. An internal combustion engine according to claim 1 wherein said radially inner portions of said support rings are spaced from the bottoms of the respective grooves so as to provide oil-receiving spaces to cushion radial movement of said rings to increase the degree of quietness of the operation of said piston structure.

* * * * *